US007925096B2

(12) United States Patent
Baxter et al.

(10) Patent No.: US 7,925,096 B2
(45) Date of Patent: Apr. 12, 2011

(54) METHOD AND APPARATUS FOR VALIDATING HOLOGRAMS

(75) Inventors: Nicholas Baxter, Welwyn Garden (GB); Brian Reid, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 789 days.

(21) Appl. No.: 11/954,262

(22) Filed: Dec. 12, 2007

(65) Prior Publication Data

US 2009/0154813 A1 Jun. 18, 2009

(51) Int. Cl.
*G06K 9/76* (2006.01)

(52) U.S. Cl. ........ 382/210; 382/154; 382/211; 382/214; 382/218; 382/219; 359/17; 359/18; 359/19; 359/566; 359/209

(58) Field of Classification Search .................. 382/210, 382/154, 211, 214, 218, 219; 359/17, 18, 359/19, 566, 209
See application file for complete search history.

(56) References Cited

U.S. PATENT DOCUMENTS 6,124,955 A * 9/2000 Hasegawa et al. .............. 359/17
2008/0298207 A1* 12/2008 Teraoka et al. ............... 369/103

* cited by examiner

*Primary Examiner* — Matt Bella
*Assistant Examiner* — Mike Rahmjoo
(74) *Attorney, Agent, or Firm* — Ronald E. Prass, Jr.; Prass LLP

(57) ABSTRACT

A method and apparatus that validates a hologram by scanning the hologram at multiple angles is disclosed. The method may include scanning a document containing the hologram at a first angle to create a first image, scanning the document containing the hologram at a second angle to create a second image, determining whether the hologram is valid, and sending the validity determination to a user interface for display to a user.

17 Claims, 7 Drawing Sheets

610

620

630

710

720

730

METHOD AND APPARATUS FOR VALIDATING HOLOGRAMS

BACKGROUND

Disclosed herein are a method and apparatus for validating holograms, as well as corresponding apparatus and computer-readable medium.

Holograms are an important part of counterfeit prevention. To the human eye, one can quickly determine if a hologram is real by simply tilting the object slightly and seeing the hologram change. A standard scanner cannot tell without human assistance if a hologram is real because it shines light and captures images from the same points. If a hologram were to be scanned and then printed, there would be little obvious difference between a scan of the original hologram and a scan of the printout.

SUMMARY

A method and apparatus that validates a hologram by scanning the hologram at multiple angles is disclosed. The method may include scanning a document containing the hologram at a first angle to create a first image, scanning the document containing the hologram at a second angle to create a second image, determining whether the hologram is valid, and sending the validity determination to a user interface for display to a user.

DETAILED DESCRIPTION

Figure 1:
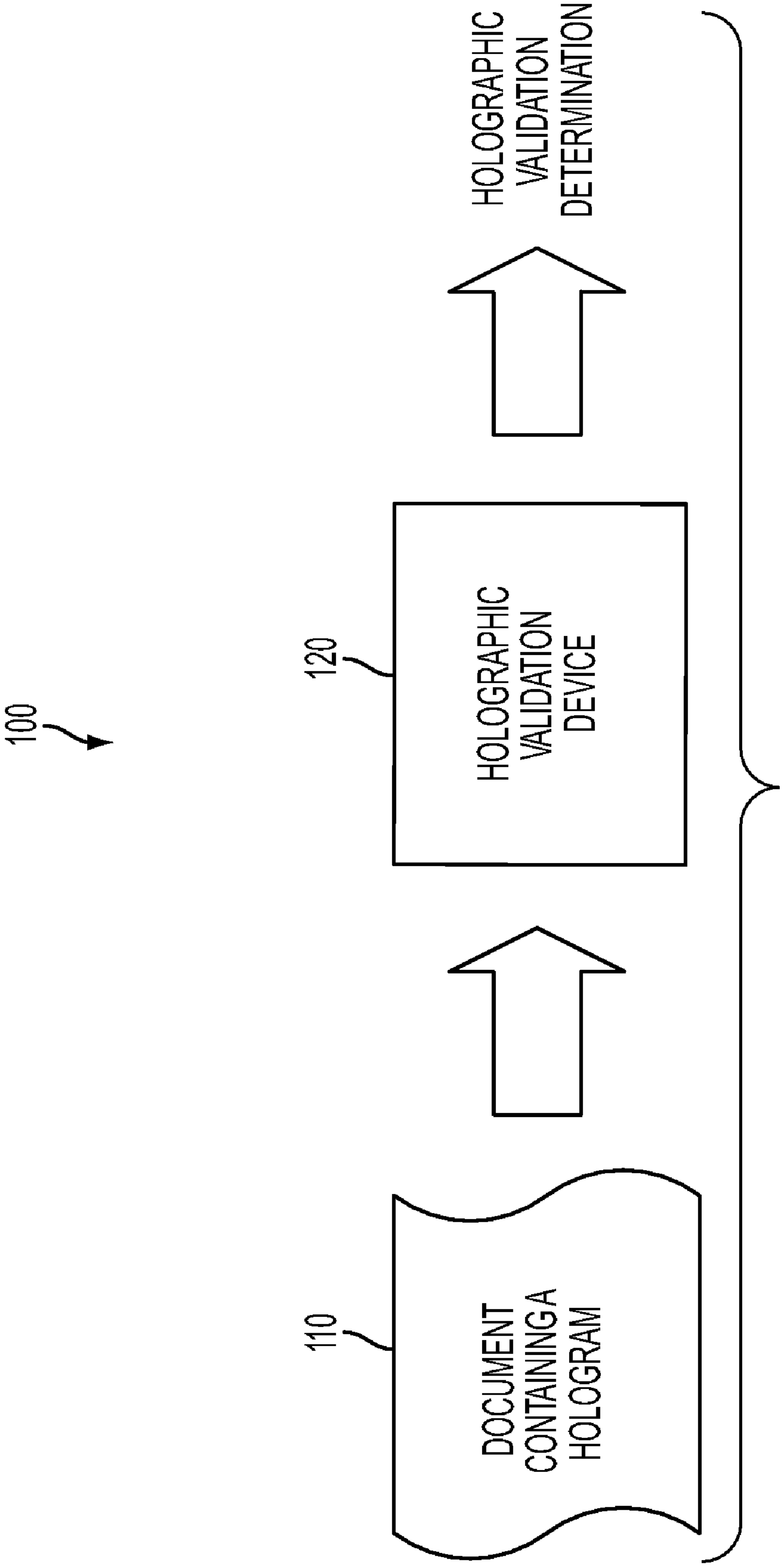
FIG. 1 illustrates an exemplary diagram of a holographic validation system in accordance with one possible embodiment of the disclosure.

Aspects of the embodiments disclosed herein relate to a method for validating a hologram, and corresponding apparatus and computer readable medium. Holograms are essentially interference patterns, meaning that both the angle of viewing and illumination affects the image seen. By illuminating a hologram from known directions and processing the image, it could be possible to automatically detect the hologram on an item to confirm that it is genuine. If a counterfeit is made of the hologram via scanning and printing, the image remains invariant to angle of incident light. This property can be used to differentiate the counterfeit from the original hologram.

One embodiment may describe a scanning device that may contain a single sensor array (a charge-coupled device (CCD) array, for example) and two light sources positioned at two different angles. Two scans may be made, one with each light source, and the difference between the two images may be calculated. An original hologram may produce a significant signal in the difference image, while a counterfeit will not. This automated validation process is advantageous in applications where manual inspection of holographic security features is time consuming and/or tedious.

Examples of hologram validation scenarios may include validation of genuine consumables, concert, airline, train, or other travel tickets, currency, identification (ID) cards, etc. The process described in this disclosure may be incorporated in an image processing device, such as a scanner, a printer or a multi-function device (MFD) to detect an attempted scan of a document containing a holographic security image. The process may also be made part of a software update package to retro fit existing machines.

The disclosed embodiments may include a method for validating a hologram by scanning the hologram at multiple angles, that may include scanning a document containing the hologram at a first angle to create a first image, scanning the document containing the hologram at a second angle to create a second image, determining whether the hologram is valid, and sending the validity determination to a user interface for display to a user.

The disclosed embodiments further include an apparatus that validates a hologram by scanning the hologram at multiple angles that may include a scanner that scans a document containing the hologram at a first angle to create a first image, and scans the document containing the hologram at a second angle to create a second image; and a holographic adjudication module that determines whether the hologram is valid and sends the validity determination to a user interface for display to a user.

The disclosed embodiments further include a computer-readable medium that stores instructions for controlling a computing device for validating a hologram by scanning the hologram at multiple angles. The instructions may include scanning a document containing the hologram at a first angle to create a first image, scanning the document containing the hologram at a second angle to create a second image, determining whether the hologram is valid, and sending the validity determination to a user interface for display to a user.

FIG. 1 illustrates an exemplary diagram of a holographic validation system 100 in accordance with one possible embodiment of the disclosure The holographic validation system 100 may include a document containing a hologram 110 and a holographic validation device 120. The document containing the hologram 110 may be any document that contains one or more hologram, such as consumable/product packaging, currency, airplane/train tickets, concert/amusement park/event tickets, identification cards, etc., for example.

The holographic validation device 120 may be any device that may be capable of adjudicating a hologram and may communicate with, be coupled to, be a component, or may be, a scanner, including a personal computer, a portable computer, a personal digital assistant, a server, a printer, a copier, a scanner, a scanning device, a facsimile (fax) device, a multi-function device (MFD), a vending machine, a change machine, a currency reader/exchanger, an airport/train kiosk, a ticket reading device, or other device that may read documents with holograms, for example. The holographic validation device 120 may output its validation determination to a user interface for display, printing, etc. for the user. The holographic validation device 120 may reject the document containing the hologram if the hologram is determined to be invalid. The holographic validation device 120 may then notify proper authorities either locally or remotely that a counterfeit has been detected.

Figure 2:
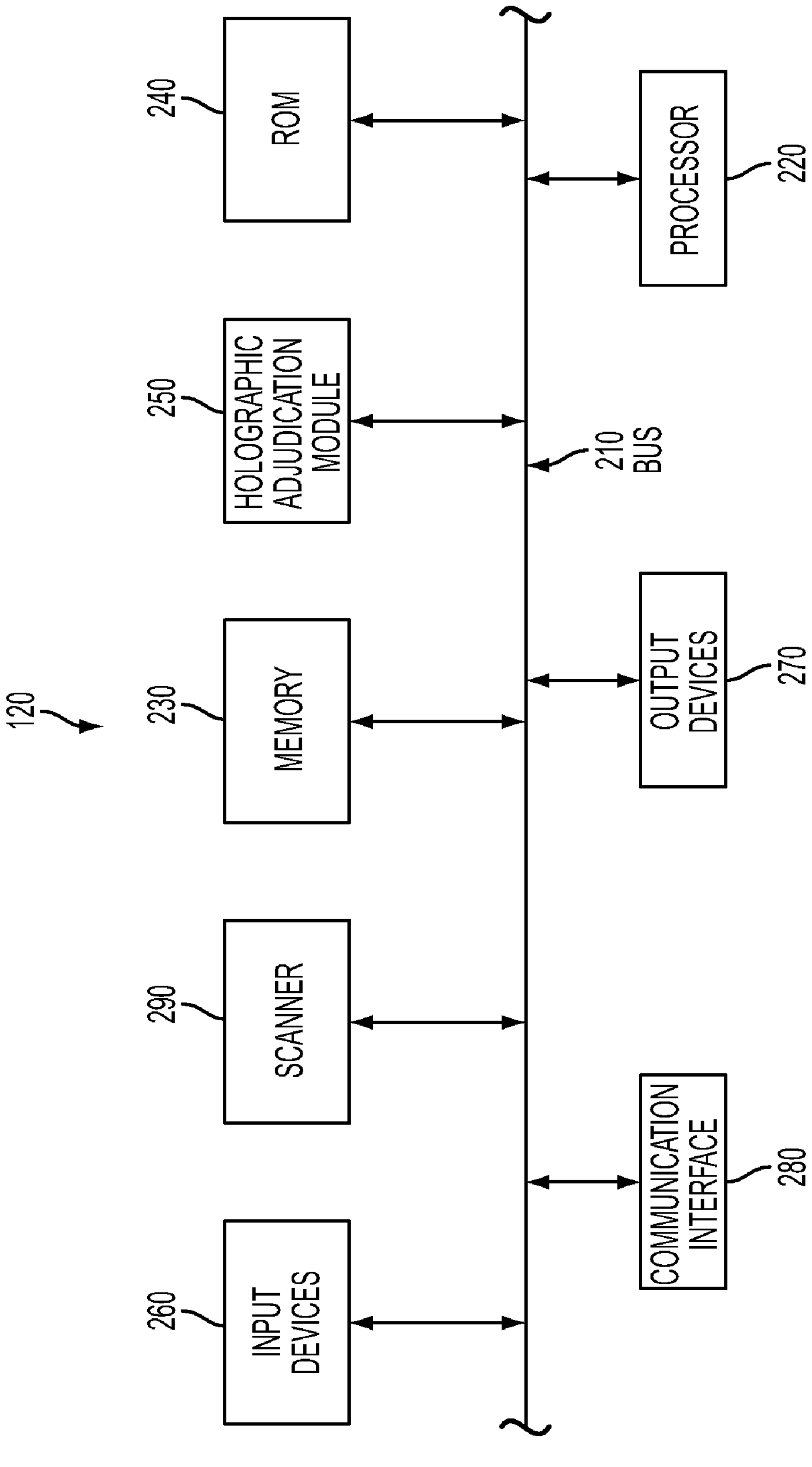
FIG. 2 illustrates a block diagram of a holographic validation device in accordance with one possible embodiment of the disclosure.

FIG. 2 illustrates a block diagram of a holographic validation device 120 in accordance with one possible embodiment of the disclosure. The holographic validation device 120 may include may include a bus 210, a processor 220, a memory 230, a read only memory (ROM) 240, a holographic adjudication module 250, an input device 260, an output device 270, a communication interface 280, and a scanner 290. Bus 210 may permit communication among the components of the holographic validation device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

Input device 260 may include one or more conventional mechanisms that permit a user to input information to the processing device 110, such as a keyboard, a mouse, a pen, a voice recognition device, touchpad, buttons, etc. Output device 270 may include one or more conventional mechanisms that output information to the user, including a display, a printer, a copier, a scanner, a multi-function device, one or more speakers, or a medium, such as a memory, or a magnetic or optical disk and a corresponding disk drive.

The holographic validation device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The holographic validation device 120 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the holographic validation device 120, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Figure 3:
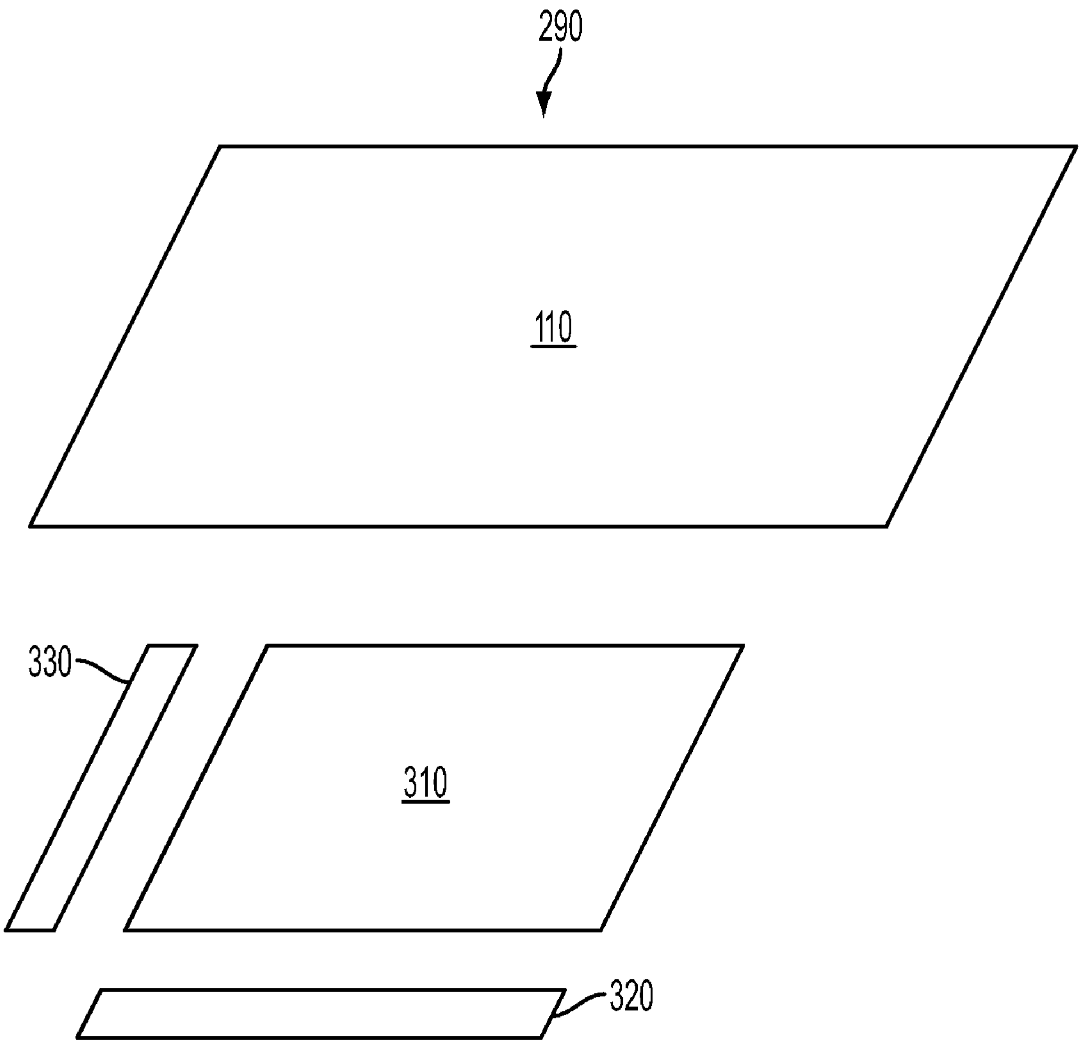
FIG. 3 illustrates a diagram of a scanner for the holographic validation device in accordance with one possible embodiment of the disclosure.

FIG. 3 illustrates a diagram of a scanner 290 for the holographic validation device 120 in accordance with one possible embodiment of the disclosure. The scanner 290 may include one or more sensor 310, and light sources 320, 330 to scan a document containing a hologram 110.

Light sources 320, 330 may represent any light source used for scanning. The light sources 320, 330 are configured to be positioned at different angles. While the figure shows the light sources 320, 330 at positions substantially 90 degrees apart, the light sources 320, 330 may be positioned at any angle apart as long as any image difference can be calculated.

While two light sources 320, 330 are shown, one of skill in the art will appreciate that the disclosure is not limited to any number of light sources. For example, in one possible embodiment, one light source may be used for scanning but rotated or moved to different angles. This requires at least two scans with the same light source. In another embodiment, there may be one light source and the document containing the hologram 110 is rotated or moved so that it is scanned two or more times at different angles. In addition, more than two light sources may also be used as long as they are positioned to scan at different angles.

Sensor 310 may represent one or more sensors (or sensor array) such as a charge-coupled device (CCD), for example. The one or more sensor 310 may be positioned in any manner to receive the scanned holographic image. The scanned images may then be sent to the holographic adjudication module 250 for processing. If more than one sensor 310 is used, the sensor 310 may be separated in any manner to facilitate scanning.

In the two light source scenario, once the document containing the hologram 110 has been positioned above the sensor 310, it can be illuminated by each light source 320, 330 independently at different angles, and so producing the two required images of the hologram. The difference in these two images will determine whether the hologram is valid.

Figure 4:
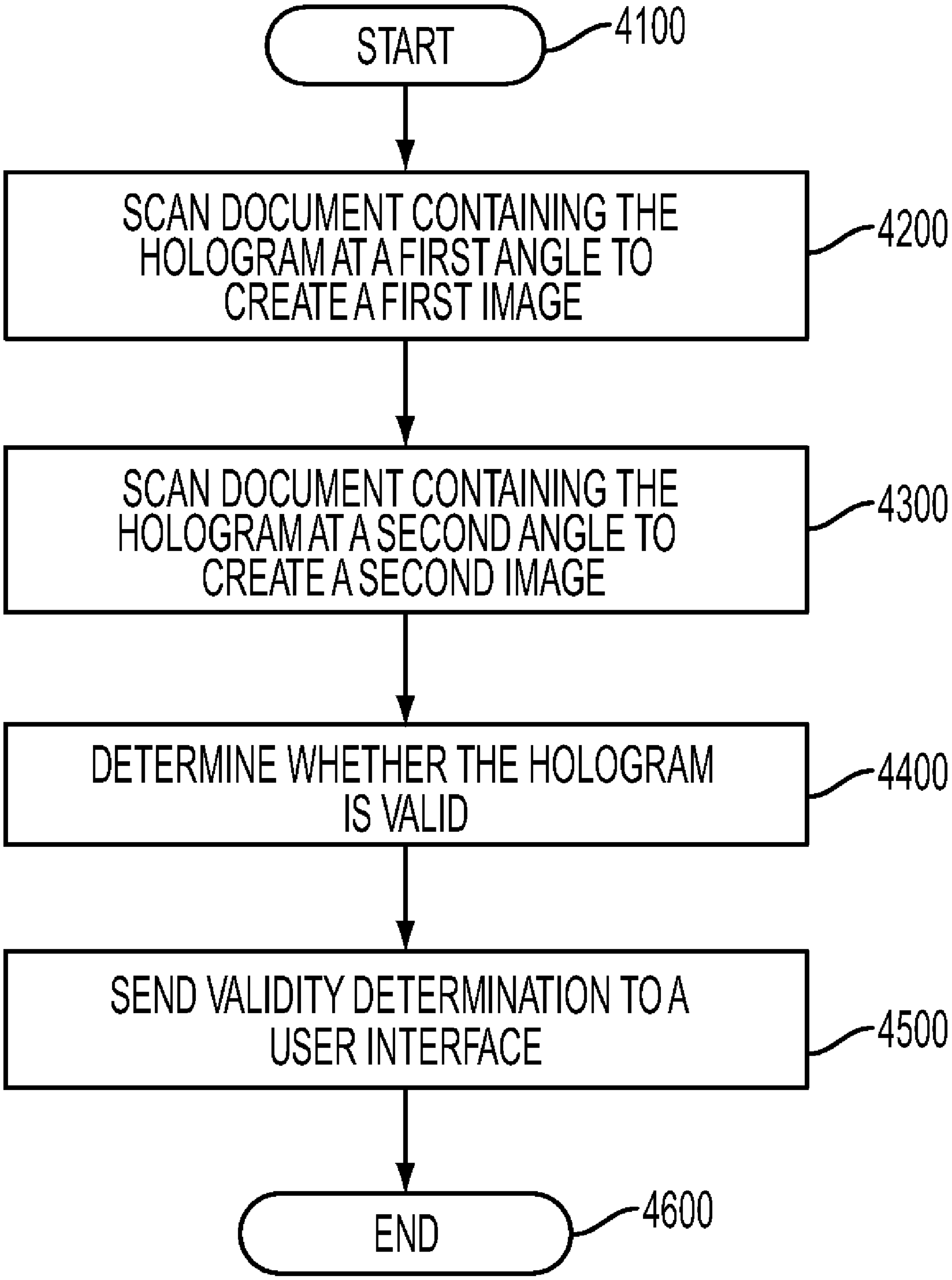
FIG. 4 is a flowchart of an exemplary hologram validation process in accordance with one possible embodiment of the disclosure.

For illustrative purposes, the operation of the holographic validation device 120 and in particular, the scanner 290 and the holographic adjudication module 250, and the holographic validation process, are described in FIG. 4 in relation to the block diagrams shown in FIGS. 1-3.

FIG. 4 is a flowchart of an exemplary hologram validation process in accordance with one possible embodiment of the disclosure. The method begins at 4100, and continues to 4200 where the scanner 290 may scan a hologram at a first angle to create a first image. At step 4300, the scanner 290 may scan a hologram at a second angle to create a second image. Note that while the flowchart only shows two angles, the scanning may performed at more than two (or multiple) angles. Furthermore, the scanning may be performed by multiple scanners for example, each scanning at one or more angles. In this manner, the document 110 may be passed, moved, rotated, etc, between the scanners or the scanners may be moved to pass over the document from multiple different angles.

At step 4400, the holographic adjudication module 250 may determine whether the hologram is valid. In this process, the holographic adjudication module 250 may determine an image difference by subtracting either the pixels of the first image from pixels of the second image, or the pixels of the second image from pixels of the first image. The holographic adjudication module 250 may then determine if the image difference exceeds a threshold. The threshold may be preset by the manufacturer or adjustable by an operator, for example. If the holographic adjudication module 250 determines that the image difference exceeds the threshold, the hologram is determined to be valid. Otherwise, if the holographic adjudication module 250 determines that the image difference does not exceed the threshold, the hologram is determined to be invalid.

At step 4500, the holographic adjudication module 250 may send the validity determination to a user interface for display to a user, for example. The process then goes to step 4600, and ends.

Figure 5A:
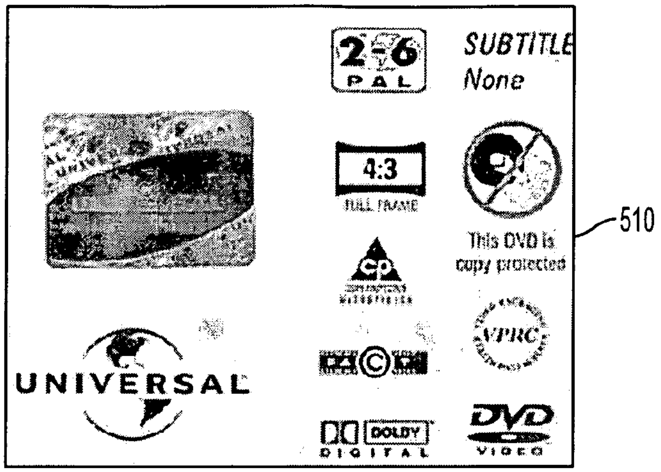
FIGS. 5A-5C illustrate an exemplary hologram scanned in accordance with one possible embodiment of the disclosure.
Figure 5B:
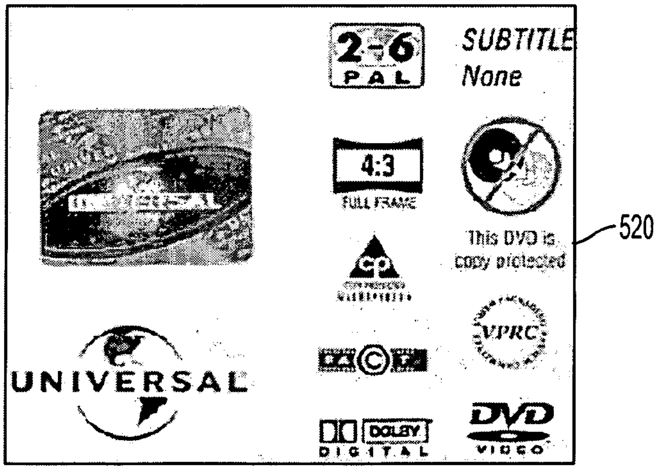
Figure 5C:
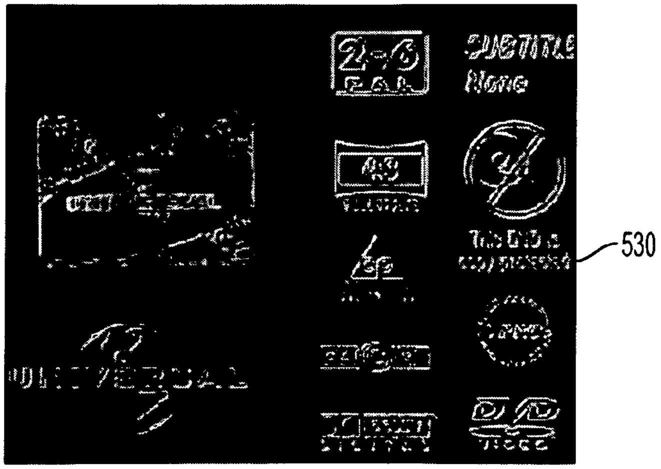

FIGS. 5A-5C illustrate an exemplary hologram scanned in accordance with one possible embodiment of the disclosure. FIGS. 5A and 5B represent the hologram scanned at different angles. FIG. 5C represents the difference between the scanned images. Since the difference is significant, the image appears to be valid.

Figure 6A:
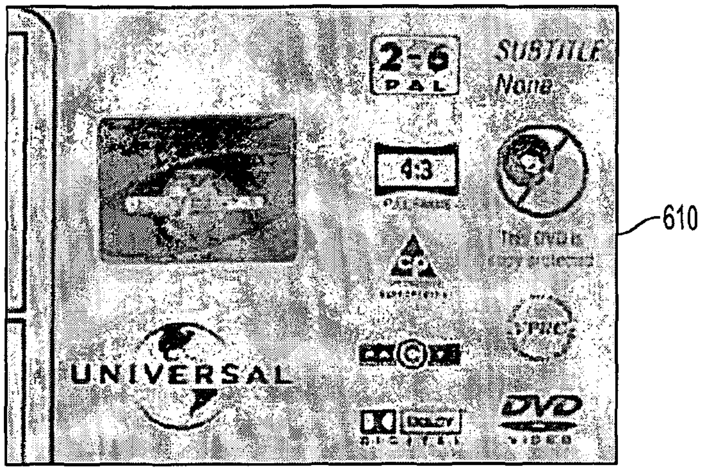
FIGS. 6A-6C illustrate another exemplary hologram scanned in accordance with one possible embodiment of the disclosure.
Figure 6B:
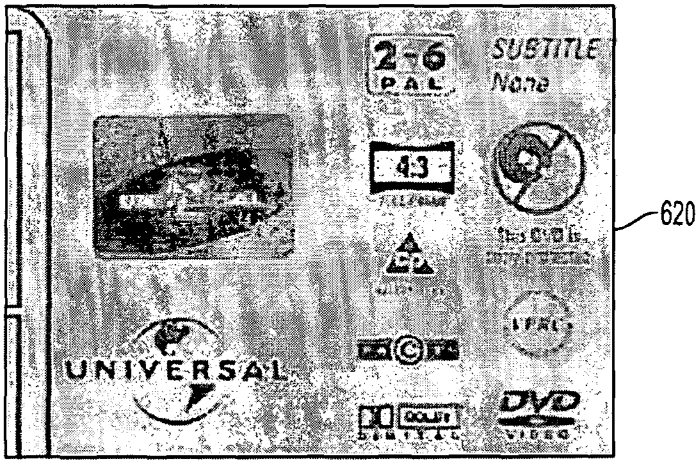
Figure 6C:
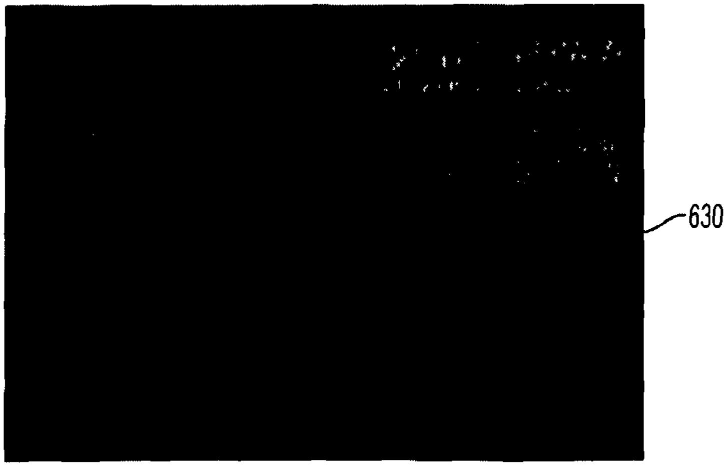

FIGS. 6A-6C illustrate another exemplary hologram scanned in accordance with one possible embodiment of the disclosure. FIGS. 6A and 6B represent the hologram scanned at different angles. FIG. 6C represents the difference between the scanned images. Since the difference is not significant (i.e., the difference is a black image), the image does not appear to be valid.

Figure 7A:
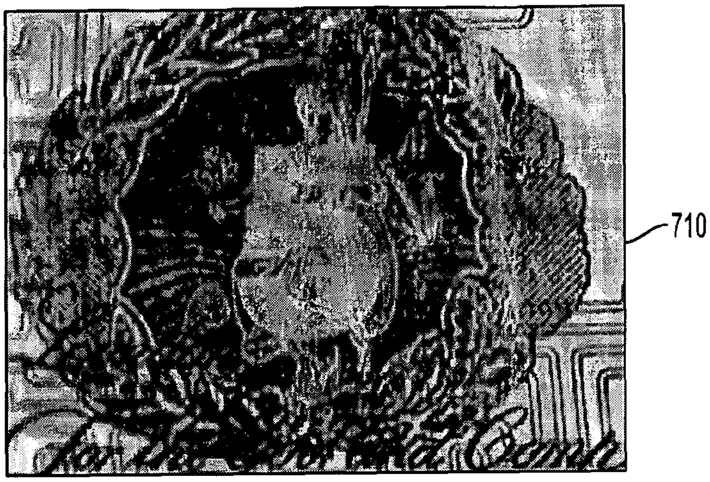
FIGS. 7A-7C illustrate another exemplary hologram scanned in accordance with one possible embodiment of the disclosure.
Figure 7B:
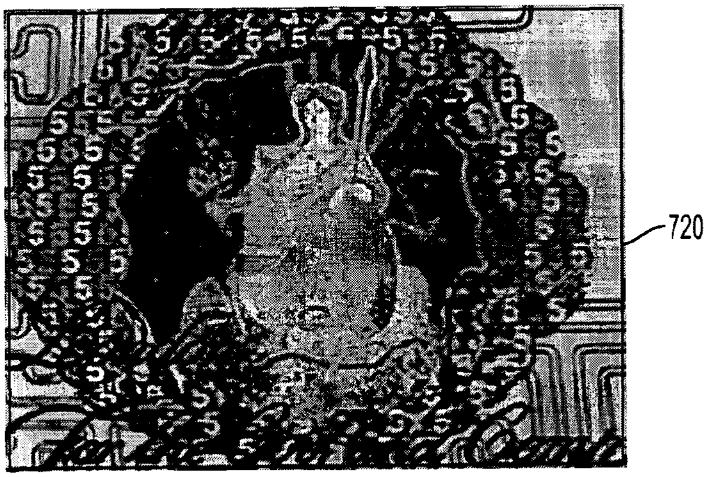
Figure 7C:
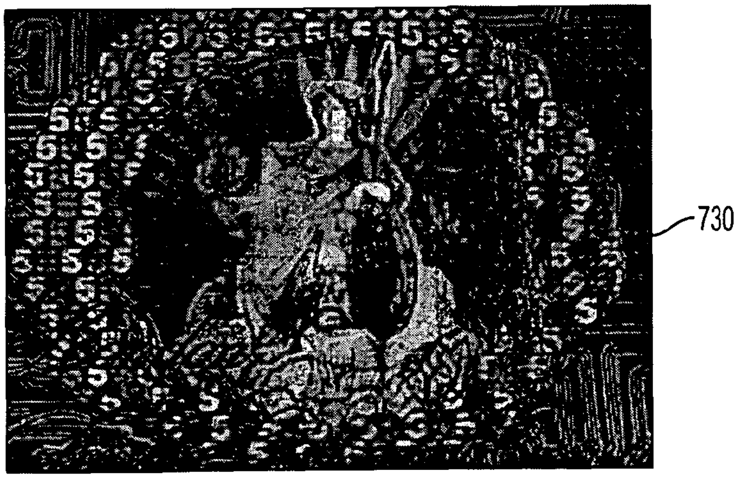

FIGS. 7A-7C illustrate another exemplary hologram scanned in accordance with one possible embodiment of the disclosure. FIGS. 7A and 7B represent the hologram scanned at different angles. FIG. 7C represents the difference between the scanned images. Since the difference is significant, the image appears to be valid.

Note that while holograms are usually in color, the process of the disclosure may also work for holograms scanned in black and white.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for validating a hologram by scanning the hologram at multiple angles, comprising:

scanning a document containing the hologram at a first angle to create a first image;

scanning the document containing the hologram at a second angle to create a second image;

determining whether the hologram is valid; and sending the validity determination to a user interface for display to a user; determining an image difference by subtracting one of pixels of the first image from pixels of the second image and pixels of the second image from pixels of the first image; and determining if the image difference exceeds a threshold, wherein if the image difference exceeds the threshold, the hologram is determined to be valid, otherwise the hologram is determined to be invalid.

2. The method of claim 1, wherein scanning is performed using a first light source, a second light source, and at least one sensor, the first light source scanning at the first angle and the second light source scanning at the second angle.

3. The method of claim 1, wherein scanning is performed using a first sensor, a second sensor, and at least one light source, the first sensor scanning at the first angle and the second sensor scanning at the second angle.

4. The method of claim 1, further comprising:

rotating at least one of the document containing the hologram and a light source from the first angle to the second angle.

5. The method of claim 1, wherein scanning is performed using multiple scanners with each scanner scanning at one or more different angles.

6. The method of claim 1, wherein if the validity determination determines that the hologram is invalid, further comprising:

rejecting the document containing the hologram.

7. An apparatus that validates a hologram by scanning the hologram at multiple angles, comprising:

a scanner that scans a document containing the hologram at a first angle to create a first image, and scans the document containing the hologram at a second angle to create a second image; and a holographic adjudication module that determines whether the hologram is valid and sends the validity determination to a user interface for display to a user; determines the validity of the hologram by determining an image difference by subtracting one of pixels of the first image from pixels of the second image and pixels of the second image from pixels of the first image, and determines if the image difference exceeds a threshold, wherein if the image difference exceeds the threshold, the holographic adjudication module determines the hologram to be valid, otherwise the holographic adjudication module determines the hologram to be invalid.

8. The apparatus of claim 7, wherein the scanner comprises:

a first light source;

a second light source; and at least one sensor, wherein the first light source scans at the first angle and the second light source scans at the second angle.

9. The apparatus of claim 7, wherein the scanner further comprises:

one light source; and at least two sensors, wherein a first sensor scans at the first angle and a second sensor scans at the second angle.

10. The apparatus of claim 7, further wherein the scanner further comprises:

at least one sensor; and a light source, wherein at least one of the document containing the hologram and the light source are rotated from the first angle to the second angle.

11. The apparatus of claim 7, wherein the scanner represents multiple scanners each scanning at a one or more different angles.

12. The apparatus of claim 7, wherein if the holographic adjudication module determines that the hologram is invalid, holographic adjudication module rejects the document containing the hologram.

13. A non-transitory computer-readable medium storing instructions for controlling a computing device for validating a hologram by scanning the hologram at multiple angles, the instructions comprising:

scanning a document containing the hologram at a first angle to create a first image;

scanning the document containing the hologram at a second angle to create a second image;

determining whether the hologram is valid; and sending the validity determination to a user interface for display to a user; determining an image difference by subtracting one of pixels of the first image from pixels of the second image and pixels of the second image from pixels of the first image; and determining if the image difference exceeds a threshold, wherein if the image difference exceeds the threshold, the hologram is determined to be valid, otherwise the hologram is determined to be invalid.

14. The computer-readable medium of claim 13, wherein scanning is performed using a first light source, a second light source, and at least one sensor, the first light source scanning at the first angle and the second light source scanning at the second angle.

15. The computer-readable medium of claim 13, wherein scanning is performed using a first sensor, a second sensor, and at least one light source, the first sensor scanning at the first angle and the second sensor scanning at the second angle.

16. The computer-readable medium of claim 13, further comprising:

rotating at least one of the document containing the hologram and the light source from the first angle to the second angle.

17. The computer-readable medium of claim 13, wherein scanning is performed using multiple scanners with each scanner scanning at one or more different angles.

* * * * *